Patented Feb. 17, 1942

2,273,382

UNITED STATES PATENT OFFICE 2,273,382

PREPARATION OF SYNTHETIC RESINS FROM BIGUANIDE DERIVATIVES AND FORMALDEHYDE

John Kenson Simons, Dormont, Pa., assignor to Plaskon Company, Inc., Toledo, Ohio, a corporation of Delaware No Drawing. Application February 15, 1939, Serial No. 256,535

10 Claims. (Cl. 260—72)

The invention relates to the preparation of novel nitrogenous resins by a reaction of formaldehyde or its polymers.

Nearly all the known resins formed by the reaction of formaldehyde with various compounds are without practical value because of undesirable color or physical properties, or poor heat resistance, water resistance or light resistance. Most of them are thermoplastic or so slowly thermosetting that they may be regarded for all practical purposes as thermoplastic.

An important difficulty with most reactions that lead to the formation of infusible resins is the impossibility of arresting the reactions at a suitable intermediate stage. It is usually difficult to obtain the kind of intermediate reaction product that is necessary to make possible the commercial production of the resin.

To be suitable for the production of an infusible resin by the ordinary methods such as casting or molding under pressure, the intermediate reaction product should be one that can be converted into an infusible resin without material evolution of water. Therefore, the preferred resin-forming reaction is not one that consists of condensation alone, but is one that includes condensation only in its initial stage. The final stage of the reaction in which the infusible resin is formed should consist of polymerization rather than condensation, because water is evolved in a condensation reaction.

Since synthetic resins are chiefly used in molded or laminated products containing a fibrous filler, the intermediate reaction product that is obtained after the completion of all condensation should be a nonvolatile substance that can be incorporated with the filler in the form of an impregnating syrup.

The infusibility and insolubility of certain resins is believed to be due to the great size and complexity of the resin molecules. Since the urea molecule is relatively simple, a substitute for urea having a larger and more complex molecule is desirable in order that a resin having greater heat resistance and water resistance than formaldehyde-urea resin may be produced.

Biguanide

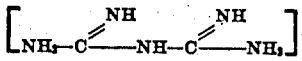

might appear to be a desirable substitute for urea as a resin-former, but biguanide does not react with formaldehyde to form a resin. The present invention arose from the discovery that substituted- and unsubstituted-phenyl biguanides react with formaldehyde to form reaction products that are capable of conversion by heat into infusible resins, and from the further discovery that more stable and heat-resistant resins can be prepared if the substituted biguanides are subjected to a "ring-closing" reaction, and are then reacted with formaldehyde or a polymer thereof.

The synthetic resins of the present invention are the more stable and heat-resistant resins so prepared. They are colorless, infusible, insoluble, unaffected by light, water-resistant and heat-resistant. No explanation is known for the variation in the behavior of biguanide and its derivatives when treated with formaldehyde.

The principal object of the invention is the preparation of novel synthetic resins and potential resins by reacting biguanide derivatives with formaldehyde or its polymers. More specific objects and advantages are apparent from the description, which merely discloses and illustrates the invention and is not intended to impose limitations upon the claims.

The biguanide derivatives that are reacted with formaldehyde in accordance with the invention to form synthetic resins are believed to be 1-phenyl-2,4-diimino-1,2,3,4-tetrahydrol-1,3,5-triazines, in which the phenyl is substituted or unsubstituted $$\left[ \begin{array}{c} \phantom{x} \\ C_6H_5-N \diagdown \phantom{x} \diagup C=NH \\ \phantom{x} CH=N \phantom{x} \end{array} \overset{NH}{\underset{C-NH}{\diagup}} \right]$$

These compounds are preferably prepared by reacting ethyl formate with the corresponding substituted- or unsubstituted-phenyl biguanide $$\left[ C_6H_5-NH-C\overset{NH}{\diagup}-NH-C\overset{NH}{\diagup}-NH_2 \right]$$

The 1-phenyl-2,4-diimino-1,2,3,4-tetrahydro-1,3,5-triazine is believed to be tautomeric with the 1-phenyl-2-imino-4-amino-1,2-dihydro-1,3,5-triazine $$\left[ \begin{array}{c} \phantom{x} \\ C_6H_5-N \diagdown \phantom{x} \diagup C-NH_2 \\ \phantom{x} CH=N \phantom{x} \end{array} \overset{NH}{\underset{C-N}{\diagup}} \right]$$

In accordance with the invention these triazines may be reacted either with formaldehyde or with a polymer thereof such as paraformaldehyde, but are preferably reacted with a solution of formaldehyde in water, in an organic solvent such as an alcohol, or in a liquid containing both water and an organic solvent. If an organic solvent such as ethyl, propyl or butyl alcohol is employed, a solution of an intermediate reaction product is obtained that is suitable for use in lacquers, and the reaction may be performed in an autoclave, if desired, to secure a reaction temperature above the boiling point of the solvent.

Intermediate reaction product

When a formaldehyde solution is used for the reaction with the triazine, the solution is preferably about neutral at the start of the reaction. About 2 mols of formaldehyde react with each mol of the triazine, but an excess of formaldehyde may be used for the reaction if desired. The reaction is expedited by heating or refluxing the solution.

For many purposes it is convenient to allow the soluble type of intermediate reaction product to remain in the form of a solution. Such a solution, after the addition of any desired ingredients, may be used as a binder in the production of impregnated or laminated products, as an adhesive for applications such as the manufacture of plywood, as a dressing or crease-proofing agent for textiles, as an ingredient for lacquers or coating compositions, as a flame-proofing agent for wood, and as a composition to be converted into a foam that can be hardened to produce an insulating material.

A thermoplastic reaction product may be prepared if desired, as in a case where a thermoplastic molding composition is to be produced. If an infusible resin is required, an acid may be used as a catalyst to cause the conversion of the intermediate reaction product into the infusible resin. Substances may be added to the intermediate reaction product that are substantially neutral at ordinary temperatures but decompose to release acids when the intermediate reaction product is heated to convert it into the infusible resin.

The substances that are reacted with formaldehyde or its polymers in accordance with the invention to form synthetic resins are prepared by subjecting substituted- and unsubstituted-phenyl biguanides to a "ring-closing" reaction. Such a reaction may be conducted as follows: A sufficient amount of absolute alcohol is added to 1 mol of the substituted- or unsubstituted-phenyl biguanide to dissolve it at 50° C., and 1 mol of ethyl formate is added to the warm solution. The solution is refluxed for 30 minutes and then cooled to separate the triazine. A yield of 40 to 80 per cent can be obtained. Examples of substituted biguanides that may be used in the foregoing reaction are phenyl biguanide, o-tolyl biguanide, p-tolyl biguanide, p-phenetyl biguanide, o-anisyl biguanide and o-chlorophenyl biguanide. The corresponding products that are obtained, which are believed to be 1-aryl-2,4-diimino-1,2,3,4-tetrahydro-1,3,5-triazines, have the following melting points: 231–2° C. for the phenyl, 159–61° C. for the o-tolyl, 227–8° C. for the p-tolyl, 195–6° C. for the p-phenetyl, 181–2° C. for the o-anisyl and 148–9° C. for the o-chlorophenyl.

A solution of an intermediate reaction product embodying the invention may be prepared as follows: 1 mol of any of the foregoing triazines and 4 mols of formaldehyde in a 37 per cent aqueous solution are warmed under reflux for about 30 minutes, and the resulting solution is allowed to cool.

Molding compositions

Fillers, plasticizers, hot plate lubricants, opacifiers, dyestuffs, pigments and other coloring matter may be incorporated with the intermediate reaction product to produce a suitable molding composition. In the preferred method of preparing a molding composition, the filler is impregnated with a solution of a soluble intermediate reaction product, and the solvent is then removed.

If fibrous cellulosic material in the form of paper pulp, wood flour or the like is employed as the filler, an aqueous solution of the reaction product used for impregnating the cellulosic material is preferably rendered acid (pH of about 3 to about 6), with an organic rather than an inorganic acid. The use of a pH of about 5 or more causes a thermoplastic molding composition to be produced. If a lower pH is used, the resulting molding composition is thermosetting, and the reaction product in the composition is converted into the infusible resin when the composition is hot-pressed.

Heat may be used to facilitate the drying of the impregnated cellulose or other filler. Of course, if the composition is thermosetting, the drying temperature should not be sufficient to render it infusible. After the water or other solvent has been removed, the dry product may be ground to a powder in order to render it homogeneous, and the powder may be employed in the usual manner for the production of molded articles.

To prepare a thermosetting molding composition from the aqueous solution obtained in accordance with the specific process described above, the following procedure is preferably employed: The solution is stirred with an amount of alpha-cellulose fiber that is approximately equal to the amount of the triazine used in preparing the solution. After the solution has been thoroughly and uniformly absorbed by the cellulose, the pH of the solution is adjusted to about 4 by the addition of phthalic acid. The wet mass is then placed in a dryer at 150° F. to remove the water. Then the dry, impregnated cellulose is ground in a ball mill, and any of the usual modifying agents may be added during the grinding. The resulting molding powder, if desired, may be compressed into blanks or preforms of the proper size for use in various molds.

Although a process for converting the intermediate reaction products into molded articles containing fillers has been described by way of example, these reaction products may be converted into finished articles by other methods, for example, by casting in open molds and baking. If no filler is used, transparent articles can be produced.

Incorporation with other resins

Since the synthetic resins of the present invention are colorless, the intermediate reaction products that have been described can be incorporated with a great variety of other resins or potential resins. Also, mixed reaction products of formaldehyde with the triazines and other substances, such as urea or thiourea, can be produced. The intermediate reaction product of formaldehyde with the triazine in the resulting composition may then be converted into the infusible resin, so that a blend or copolymer of the resins is obtained.

The embodiments of the invention that have been described may be modified to meet various requirements.

Having described my invention, I claim:

1. A method of producing an intermediate reaction product capable of conversion by heat into an infusible resin that comprises reacting a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkyl-phenyl, alkoxy-phenyl, halo-phenyl and unsubstituted phenyl with a substance selected from the group consisting of formaldehyde and polymers thereof.

2. A method of producing an intermediate reaction product capable of conversion by heat into an infusible resin that comprises heating a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkyl-phenyl, alkoxy-phenyl, halo-phenyl and unsubstituted phenyl with an aqueous solution of formaldehyde.

3. A method of producing a synthetic resin that comprises reacting a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkylphenyl, alkoxy-phenyl, halo-phenyl and unsubstituted phenyl with a substance selected from the group consisting of formaldehyde and polymers thereof.

4. A method of producing an infusible resin that comprises reacting a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkyl-phenyl, alkoxy,phenyl, halo-phenyl and unsubstituted phenyl with a substance selected from the group consisting of formaldehyde and polymers thereof to form an intermediate reaction product, and carrying out the conversion of said product to an infusible resin in the presence of an acid.

5. A method of producing a thermosetting molding composition that comprises reacting a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkyl-phenyl, alkoxy-phenyl, halo-phenyl and unsubstituted phenyl with a substance selected from the group consisting of formaldehyde and polymers thereof to form an intermediate reaction product, impregnating a filler with a solution of said product, and removing the solvent.

6. An intermediate reaction product of formaldehyde with a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkyl-phenyl, alkoxy-phenyl, halo-phenyl and unsubstituted phenyl, capable of conversion by heat into an infusible resin in the presence of an acid.

7. A thermosetting molding composition comprising a filler and an intermediate reaction product of formaldehyde with a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkyl-phenyl, alkoxy-phenyl, halo-phenyl and unsubstituted phenyl, capable of conversion by heat into an infusible resin.

8. A resinous reaction product of formaldehyde with a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkyl-phenyl, alkoxy-phenyl, halo-phenyl and unsubstituted phenyl.

9. An infusible product comprising a filler and a reaction product of formaldehyde with a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkyl-phenyl, alkoxy-phenyl, halo-phenyl and unsubstituted phenyl.

10. A solution comprising an intermediate reaction product of formaldehyde with a substance selected from the group consisting of 1-R-2,4-diimino-1,2,3,4-tetrahydro-1,3,5-triazines and 1-R-2-imino-4-amino-1,2-dihydro-1,3,5-triazines in which R is a radical selected from the group consisting of alkyl-phenyl, alkoxy-phenyl, halo-phenyl and unsubstituted phenyl, capable of conversion by heat into an infusible resin, and a solvent therefor.

JOHN KENSON SIMONS.